United States Patent [19]

Yamamoto et al.

[11] Patent Number: 4,605,936

[45] Date of Patent: Aug. 12, 1986

[54] THERMAL HEAD WITH CUTAWAY SUBSTRATE

[75] Inventors: Yoichi Yamamoto; Mitsuhiro Shimada, both of Nara, Japan

[73] Assignee: Sharp Kabushiki Kaisha, Osaka, Japan

[21] Appl. No.: 637,979

[22] Filed: Aug. 6, 1984

[30] Foreign Application Priority Data

Aug. 25, 1983 [JP] Japan ................................ 58-156730

[51] Int. Cl.⁴ ............................................ G01D 15/10

[52] U.S. Cl. ............................................ 346/76 PH

[58] Field of Search .................................... 346/76 PH

[56] References Cited

U.S. PATENT DOCUMENTS

| | | | |
|---|---|---|---|
| 3,453,649 | 7/1969 | Hurst et al. | 346/76 PH |
| 4,233,611 | 11/1980 | Nakano et al. | 346/155 |
| 4,259,676 | 3/1981 | Salmon et al. | 346/76 PH |
| 4,399,444 | 8/1983 | Moriguchi et al. | 346/76 PH |
| 4,456,915 | 6/1984 | Crooks et al. | 346/76 PH |

*Primary Examiner*—E. A. Goldberg
*Assistant Examiner*—Gerald E. Preston
*Attorney, Agent, or Firm*—Birch, Stewart, Kolasch & Birch

[57] ABSTRACT

A thermal head comprises a substrate providing a flat surface and an oblique surface. The oblique surface carries a plurality of thermal resistor elements while the flat surface carries a driving element for driving the thermal resistor elements. The oblique surface is close to the surface of a recording paper positioned on a platen of a recording apparatus. A wiring pattern is provided for connecting the thermal resistor elements and the driving element.

3 Claims, 4 Drawing Figures

THERMAL HEAD WITH CUTAWAY SUBSTRATE

BACKGROUND OF THE INVENTION

The present invention relates to a recording apparatus and, more particularly, to a thermal head for the recording apparatus of the heat-sensitive printing paper type or a heat transfer type, in which the thermal head is serially scanned in the width direction of a paper.

A conventional thermal head comprises a flat rectangular substrate carrying a plurality of thermal resistor elements or dots corresponding to a matrix-shape, so that some thermal resistors are heated by selectively applying an electric pulse to produce a thermal pattern representative of a desired character. A driving element for driving the thermal resistor elements may also be mounted on the substrate.

Conventionally, to provide heat radiation, the plurality of thermal resistor elements are disposed on the substrate with a margin from the outline side of the substrate. Usually, the thickness of the thermal resistor elements is about 100 μm. Because of the thickness of the driving element and the right edge of the substrate, it is difficult to locate the plurality of thermal resistor elements close to the surface of a recording paper. The right edges of the substrate may collide with the paper surface near some of the thermal resistor elements and prevent some periheral elements of the thermal resistor elements from being close to the paper surface.

Accordingly, conventionally, very exact positioning of the thermal head is required and is very complicated.

SUMMARY OF THE INVENTION

Accordingly, it is an object of the present invention to provide an improved thermal head for easily assuring close contact between all of a plurality thermal resistor elements and a recording paper surface.

It is another object of the present invention to provide an improved cutaway thermal head for easily assuring close contact between all of a plurality of thermal resistor elements and a paper surface without any specific positioning.

It is a further object of the present invention to provide an improved thermal head comprising a cutaway substrate providing a flat surface for carrying a driving element and an oblique surface for carrying a plurality of thermal resistor elements.

Briefly described, in accordance with the present invention, a thermal head comprises a cutaway substrate providing an oblique surface for carrying a plurality of thermal resistor elements. The oblique surface is in close contact with the surface of a recording paper positioned on a platen of a recording apparatus. A wiring pattern is provided for electrically connecting the thermal resistor elements on the oblique surface. A driving element for driving the thermal resistor elements may be mounted on a flat substrate different from the oblique surface.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
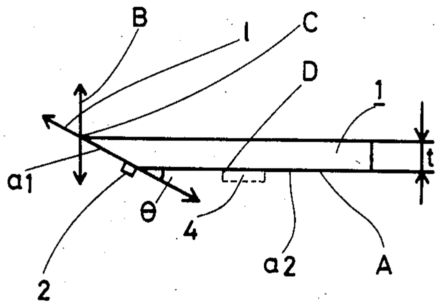
FIG. 1 is a side view of a cutaway thermal head of the present invention.

FIG. 1 is a side view of a cutaway thermal head according to the present invention.

Figure 2:
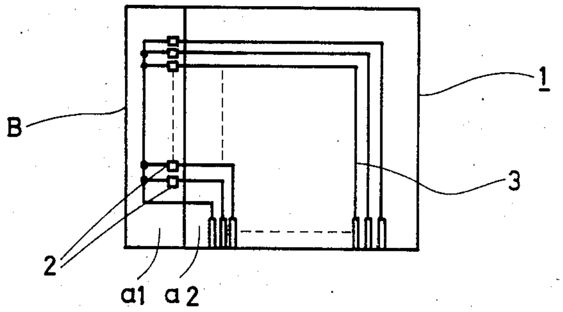
FIGS. 2 and 3 are front views of FIG. 1.
Figure 3:
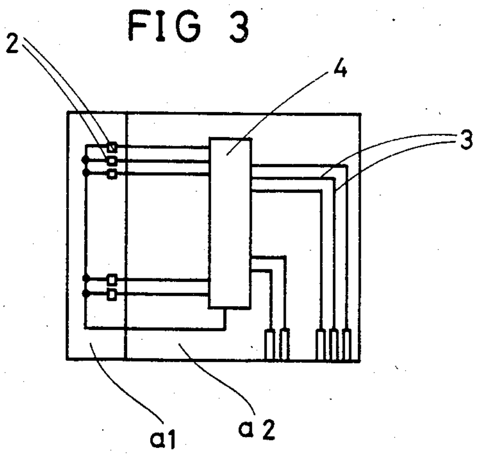

FIGS. 2 and 3 are front views of the thermal head, showing a plurality of thermal resistor elements and a wiring pattern as formed on a substrate.

The thermal head is serially scanned in a width direction of a recording paper in a recording apparatus of the type of a heat-sensitive paper or thermal transfer.

With reference to FIGS. 1 to 3, the cutaway thermal head is constructed with a single flat and cutaway substrate 1 of a ceramic or like materials with a thickness of t. One edge B of a flat surface A of the substrate 1 is cut at a cutting line 1 at a predetermined angle theta O to form an oblique surface a1 and a flat surface a2.

Preferably, the degree of the cutting angle theta is of the order of about 10–30 degrees when the thickness t of the substrate 1 is about 2 mm although it is not limited to this amount. It may be necessary to change the angle depending on the thickness of the substrate 1. When a driving element 4 such as a semiconductor chip is mounted on the substrate 1, it may be necessary that the cutting angle theta should be more than an angle extending a corner C of the oblique surface a1 and an edge D of the chip 4 in FIG. 1.

On the cutaway surface a1, a pattern for a line 2 of thermal resistor elements is printed and formed while, on the flat surface a2 of the substrate 1, a wiring pattern 3 for the thermal resistor elements is printed and formed.

In case where the driving element 4 of the semiconductor chip is integrally assembled into the thermal head, the chip 4 may be mounted on the flat surface a2 as shown in FIG. 3.

As can be seen in FIGS. 2 and 3, the thermal resistor element line 2 is positioned on the oblique surface a1 near and along the boundary between the oblique surface a1 and the flat surface a2.

Figure 4:
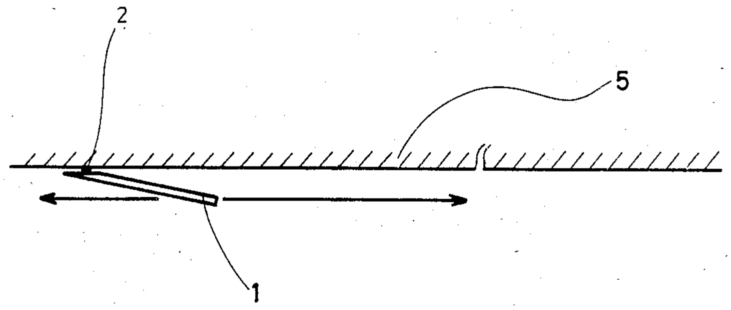
FIG. 4 is a side view of a combination with the thermal head and a recording paper, showing the relationship between the cutaway thermal head and a paper surface.

As shown in FIG. 4, the thermal head 1 is moved while the thermal resistor element line 2 on the oblique surface 2 is in close contact with the surface of a paper positioned on a platen of the recording apparatus. The direction of arrow indicates a reciprocal movement of the thermal head 1.

The oblique surface a1 of the thermal head 1 is assembled so as to be substantially parallel with the surface of the platen. Even if they are not exactly parallel with each other, the substrate 1 of the thermal head can be tilted without any contact between an edge of the substrate 1 and the platen, so that the thermal resistor element line 2 becomes in uniformly close contact with the recording paper on the platen. Precise positioning of the thermal head can be reduced to thereby make it easy to assemble the thermal head into the recording apparatus.

Since the chip 4 is mounted on the flat surface a2 different from the cutaway surface a1, the chip 4 can easily be mounted without any disturbance by the thermal resistor elements.

While only certain embodiments of the present invention have been described, it will be apparent to those skilled in the art that various changes and modifications may be made therein without departing from the spirit and scope of the present invention as claimed.

What is claimed is:

1. A thermal head for a recording apparatus comprising:

a substrate having a first flat surface and a second surface generally opposed thereto and having a flat surface and an oblique surface therewith;

a group of thermal resistor elements formed on said oblique surface of said substrate;

wiring means for said group of thermal resistor elements; and a driver element for driving said group of thermal resistor elements, said driving element being mounted on said flat surface of said second surface of said substrate.

2. The head of claim 1, wherein the degree of cutting away said substrate to provide said oblique surface is of the order of about 10–30.

3. The head of claim 1, wherein the driver element is a semiconductor chip.

* * * * *